Patented Feb. 24, 1953

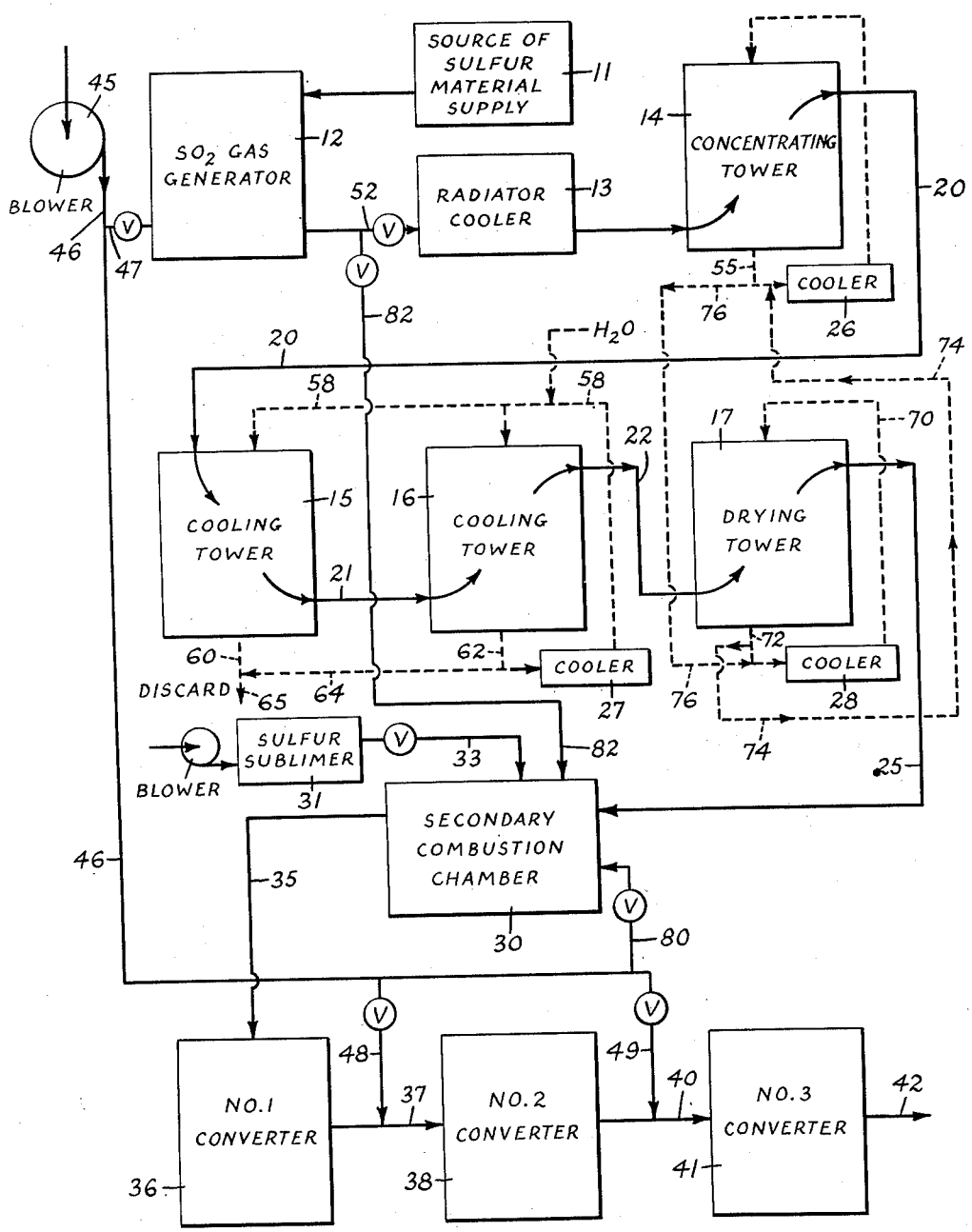

2,629,651

UNITED STATES PATENT OFFICE 2,629,651

MANUFACTURE OF SULFURIC ACID

Henry F. Merriam, West Orange, and Urban S. Lauber, Ridgewood, N. J., assignors to Allied Chemical & Dye Corporation, New York, N. Y., a corporation of New York Application July 15, 1949, Serial No. 104,838

3 Claims. (Cl. 23—175)

This invention relates to improvements in the manufacture of sulfuric acid.

The invention, its objects and advantages may be understood from the following description taken in connection with the accompanying drawing showing diagrammatically apparatus in which a preferred embodiment of the process of the invention may be carried out.

Referring to the drawing, numerals 11, 12, 13, 14, 15, 16 and 17 respectively indicate a source of sulfurous material supply, an $SO_2$ gas generator, a cooler, a gas cooler and acid concentrator tower, a second gas cooling tower, and a drying tower. Gas generator or combustion chamber 12 may be any apparatus in which sulfurous starting material is burned, decomposed, or otherwise treated to form an $SO_2$ gas which is at relatively high temperature, e. g. 1600° F, and usually much higher, contains substantial amounts of water vapor, and is suitable for use as $SO_2$ gas in the manufacture of sulfuric acid by the contact process. In a preferred embodiment of the invention, the sulfurous starting material is hydrogen sulfide gas. While such gas may contain $H_2S$ in quantities as low as 25–30% by volume, preferably the sulfurous starting material is concentrated hydrogen sulfide gas having an $H_2S$ content in excess of 85% by volume. Such gases are readily obtainable in industrial operations and frequently have an $H_2S$ concentration of 97–98% (dry basis). In the circumstance of use of $H_2S$ gas, generator 12 is any suitable form of a combustion chamber provided with equipment enabling feed thereto of regulated amounts of $H_2S$ and air for combustion supporting purposes. Cooler 13 may be of the radiator type, or alternatively a waste heat boiler. Tower 14 may provide a packed chamber arranged for upflow of gas and downflow of cooling liquor e. g. sulfuric acid. Gas leaving the top of tower 14 may be run through line 20 into the top of an unobstructed tower or quench leg 15 in which the gas stream flows downwardly co-current with cooling liquid. The gas stream discharged from the bottom of tower 15 flows through line 21 into the bottom of a second cooling tower 16 which may be arranged to afford updraft gas flow countercurrent to cooling liquor. Tower 17, into which the gas stream flows from line 22, may be a drying tower of any suitable design known in the art, i. e. constructed to provide for countercurrent flow of gas and sulfuric acid drying medium under conditions to discharge from tower 17 and into line 25 and $SO_2$ gas which may be dried to any desired extent in accordance with the particular operating conditions. Towers 14, 16 and 17 are each provided with liquor coolers 26, 27 and 28 plus the necessary pumping and piping accessories (not shown) to effect controlled flow and cooling of the liquors circulated over the respective towers.

Numeral 30 indicates a secondary combustion chamber into which the gas stream in line 25 is fed. The purpose and function of chamber 30 will hereinafter more fully appear. In one embodiment of the invention, a mixture of sulfur vapor, $SO_2$ gas and nitrogen is formed in sulfur burner or sublimer 31, and is charged into chamber 30 through line 33. The exit gas of chamber 30 is run directly through line 35 into converter 36, and the gas stream is then passed through line 37, converter 38, line 40, and converter 41 in series, and into $SO_3$ conduit 42 as indicated on the drawing. Undried air at atmospheric temperature is supplied to the process by a main blower 45 the pressure main 46 of which communicates through valved connections 47, 48 and 49 with the $H_2S$ burner 12, and with the interstage pipe connections 37 and 40 in the converter system. The $SO_3$ gas exiting converter 41 into conduit 42 is conducted thereby e. g. to an absorption system for making strong sulfuric acid, or to a condenser for condensing out any contained water vapor and an equivalent amount of $SO_3$ to thereby condense out $H_2SO_4$ and form dry $SO_3$ which may be used in an oleum system or in a conventional absorber producing 99% sulfuric acid.

A preferred embodiment of the invention may be exemplified as follows. An $H_2S$ gas containing about 96–98% $H_2S$, some $CO_2$ and possibly a trace or more of hydrocarbons is burned in primary combustion chamber 12 with an amount of air preferably substantially in excess of that theoretically required to oxidize the $H_2S$ to $SO_2$ and $H_2O$. Such air excess, which may be of the order of 50 to 90%, effects complete combustion of the $H_2S$ and oxidation of any deleterious hydrocarbons which may be present, and also provides in the resulting gas stream further amounts of oxygen which are needed subsequently in the process. The combustion chamber exit gas is at temperature generally not less than 1600° F., and usually of the order of 1800–2000° F. and higher. A typical gas may have a temperature of 2000° F. or upwards, and contain by volume (dry basis) about 8% $SO_2$, about 9–10% oxygen, and a substantial load of moisture. The amount of water vapor present in such a gas is normally substantially in excess of that needed to combine with all of the $SO_3$ (produced by subsequent catalytic oxidation of the $SO_2$ present) to form 100% $H_2SO_4$. Thus, the moisture content of the gas stream at this point may vary widely, and up to amounts which, if not removed from the system, would result in formation of sulfuric acid of strengths as low as say 85% $H_2SO_4$. Consequently, to provide for production of strong e. g. 98–99% sulfuric acid or for $SO_3$ which may be utilized for manufacture of oleum, a large portion or if desired substantially all of the water present in the gas is removed.

The hot gas stream from combustion chamber 12 runs through line 52 to cooler 13 which may be designed to effect cooling of the gas down to about 1000° F. The gas stream is then fed into the bottom of concentrating tower 14 into the top of which is introduced sulfuric acid at temperature of the order of 250° F. and of $H_2SO_4$ strength of about say 72%. During downflow of the sulfuric acid liquor in the tower 14, water is evaporated out of the acid which may run out of the bottom of tower 14 into line 55 at strength of about 72.5%. The gas stream leaves the top of tower 14 into line 20 preferably at temperature of about 250° F. Whatever the particular design or construction of the tower 14 may be, countercurrent flow of acid and gas therethrough should be controlled preferably so that the acid strength increases preferably about 0.5% in $H_2SO_4$ value, and the gas is cooled down to within the range of 240–260° F.

The gas is then charged into the top of an open quench tower or leg 15 into the top of which is fed from line 58 a spray of water which may be initially at temperature of about 100° F. The gas and water flow co-current through tower 15, cooling the gas and condensing some of the water content thereof. The water as discharged from the bottom of tower 15 through line 60 may be at temperature of about 130–140° F. and contain 1–2% $H_2SO_4$. Such water may be cooled and recirculated over tower 15 or be discarded.

The gas stream leaving the bottom of tower 15 is introduced into the bottom of the second cooling tower 16 into the top of which is fed water containing say 1–2% $H_2SO_4$ at temperature initially of about 100° F. from line 58. During countercurrent flow of water and gas in this tower, the gas stream is cooled down to about 100° F. and most of the water thereof is condensed out, the liquid effluent at the bottom of the tower in line 62 being at temperature of about 130–140° F. and containing e. g. 1–2% $H_2SO_4$. The greater part of such water may be cooled and recirculated over towers 15 and 16, and the "make" of tower 16 is discharged through line 65 to waste. Overall control of the cooling in towers 15 and 16 is preferably such that the gas stream leaving tower 16 through line 22 is at temperatures as close as practicable to atmospheric temperature. While about 100° F. is an average sought-for value, this temperature may vary from say 80 to 120° F. In any case, the water content of the gas at this point is reduced to saturation at the temperature of the gas leaving the tower, e. g. the water content may vary from 0.8 to 2.00 grams $H_2O$ per cu. ft. of gas. Thus, the gas entering tower 16 may contain the water vapor present in the air used for combustion in generator 12, the water vapor formed by combustion of $H_2S$, and water evaporated out of the acid in the concentrating tower 14. Accordingly, it will be seen that towers 15 and 16 effect the removal from the gas stream of the great bulk of the contained water, all of which water is discharged from the system at a single point, namely outlet 65.

The next step in the process is the drying of the gas stream to an extent which permits use in all subsequent stages of the process of undried atmospheric air but nevertheless makes about 65–70% of the $SO_3$, ultimately formed, available for fortification of weak acid or manufacture of oleum, the balance of the $SO_3$ being available for manufacture of 66° Bé. or 99% sulfuric acid. Drying the gas stream to the extent desired may be effected by feeding into the top of tower 17 through line 70 sulfuric acid of strength preferably in the range of about 67–70% $H_2SO_4$, and at temperature in the neighborhood of 120° F. or less. During countercurrent flow of gas and drying acid in tower 17, the gas is dried substantially but not necessarily thoroughly, and the gas stream leaves the top of the drying tower at temperature of about 120° F. Drying acid is discharged from the bottom of the tower at a strength which may be in the range of 66.5–69.5% $H_2SO_4$, and have a temperature in the neighborhood of 130° F. Normally the gas discharged from tower 17 may contain water vapor in the amount of about 0.3 gram per cu. ft. of gas. In a preferred embodiment, countercurrent flow of gas and drying acid in tower 17 is regulated so that the gas discharged therefrom is at temperature in the range of about 115° F. to about 125° F. In these circumstances, when feeding into the top of tower drying acid of strength in the range of 67–70% $H_2SO_4$, drying acid $H_2SO_4$ strength in one pass through the tower is reduced about 0.5%.

Some of the weakened drying acid is drawn out through line 72 and is fed through connection 74 into the circulating system of concentrating tower 14. While in the liquor circulating system of tower 14, the weakened drying acid is concentrated back up to strength of about 71–73%. Part of the acid recirculated in the system of tower 14 is drawn out through connection 76 and run back into the liquor circulating system of the drying tower to maintain the strength of the drying acid. By recirculating acid from the drying tower back to the concentrating tower and then forward to the drying tower, water picked up in the acid in the drying tower is transferred back into the concentrating tower, evaporated out of the acid and carried by the main gas stream into towers 15 and 16 in which such water is condensed out of and ultimately discharged from the process.

The gas stream leaving drying tower 17 through line 25 contains, in addition to some moisture, substantial quantities of sulfuric acid mist derived from moisture and small amounts of $SO_3$ incidentally formed in the combustion chamber. In accordance with the invention this mist is changed to a non-deleterious form by treatment of the gas stream in the secondary combustion chamber 30. The latter may be of any suitable construction or design provided that the portions thereof in direct contact with the gases are built of refractory material such as firebrick of various types. The exterior of chamber 30 may be insulated to minimize heat losses.

In chamber 30, the gas stream containing the sulfuric acid mist is abruptly heated to temperature appreciably above the dew point of the acid mist under the particular conditions of operation. Ordinarily, temperature rise in the secondary combustion chamber is effected to such an extent that temperatures prevailing in chamber 30 are at least 700 F. Preferably, higher temperatures are utilized, and heating of the gas stream is such as to raise the temperature thereof to at least approximating but not substantially in excess of initial conversion temperature. Specifically, the preferred temperatures in chamber 30 are of the order of 750–850° F. By so proceeding, the invention affords several advantages. The acid mist is vaporized and changed to non-deleterious form which permits the use of ordinary steel in the construction of the converter system. Cooling of the gases has been necessary in order to remove the excessive amounts of water vapor formed by combustion of $H_2S$. This cooling results in formation of $H_2SO_4$ mist which would destroy heat exchangers normally used for heating the burner gas to initial conversion temperature. Such heat exchangers are eliminated by the use of heating chamber 30. Further, the temperature of the gas stream at the same time is raised to initial conversion temperature which permits introduction of the exit gas of the combustion chamber directly into the converter system. More importantly, the improved procedure provides for elimination of the relatively expensively constructed coke box or precipitator heretofore employed for separation of acid mist. In prior methods utilizing a coke box for separation of acid mist, it was a practical necessity, in order to avoid prohibitive coke box construction costs, to design the plant as a whole so as to provide for operation of the coke box at a slight or appreciable minus pressure. Plants of this nature involve the use of a drying tower following the coke box, and then a blower the suction side of which is connected with the exit of the drying tower and the pressure side of which communicates with the inlet of converter system. In these prior methods, regardless of good coke box and drying tower operation practice, at times traces of acid mist may pass into and through the blower with damaging results. In the present improvements, the coke box is replaced by a secondary combustion chamber which may be relatively cheaply constructed and yet operated under positive pressure. Thus, the invention provides for elimination of heat transferrers and the coke boxes used in conventional sulfuric acid systems where cooling and purification of gases are required to eliminate water vapor. Further, elimination of the coke box makes it possible to operate the entire plant under positive pressure and place the blower, such as 45 of the drawing, at the head of the system, a point where the blower is required to handle only at atmospheric air, and is not subjected to the corrosive effects of any acid mist whatsoever.

Adequate temperature increase of the gas stream in chamber 30 may be effected in several convenient ways. For example, a brimstone sublimer or burner indicated at 31 may be employed. Such burner may be of conventional construction, and operated in such a way as to produce in exit line 33 a mixture of sulfur vapor, $SO_2$ gas and nitrogen. In operation, brimstone and permissibly undried atmospheric air are fed into the inlet end of the burner in the usual manner. The gas mixture produced and discharged into line 33 may contain for example about 18% sulfur dioxide, about 14% sulfur vapor by volume calculated as $S_8$, the remainder being nitrogen. This mixture of hot sulfur dioxide and sulfur vapor is charged into a chamber 30 and, at the temperature prevailing therein, the sulfur vapor is burned to $SO_2$ liberating heat in sufficient quantities to maintain in chamber 30 the temperatures desired for the particular situation at hand. It will be recalled that in the operation of primary $H_2S$ burner 12, a substantial excess of air is utilized. The oxygen of such air passes through the system previously described, enters chamber 30 through line 25, and is advantageously utilized in chamber 30 to support combustion of the sulfur vapor introduced through line 33. In a typical run in which an excess of e. g. say 70–80% of air is employed in the primary combustion chamber 12, introduction of extraneous air into secondary combustion chamber 30 is unnecessary, since the inflowing gas stream from line 25 already contains sufficient oxygen to support combustion of the elemental sulfur fed into chamber 30. If, for some desired reason, a substantial excess of air is not employed in primary combustion chamber 12 additional needed quantities of air may be charged into a chamber 30 through valve controlled line 80. In view of the permissibly widely varying conditions which may exist in chamber 30 with respect to composition of the gas stream in line 25 and the size of the operation at hand, it is not possible to delineate limits as to composition and quantity of the sulfurous material introduced into chamber 30 for combustion and resultant temperature raising purposes. The control point of operation is the temperature of the composite gas exiting chamber 30 into line 35, and regulation of burner 31 may be gauged accordingly. Such temperature should lie within the range of about 700–850° F., and is preferably about 800° F., an average initial conversion temperature. In the specific procedure of the invention being exemplified, the gas exiting chamber 30 may contain about 11% $SO_2$, about 7% oxygen, i. e. sufficient oxygen for theoretical catalysis of $SO_2$ but insufficient for commercial catalysis of the $SO_2$. While, as stated above, it is preferred to operate the combustion chamber 12 with a substantial excess of air, preferably this excess is limited so that the exit gas of chamber 30 is deficient in oxygen for commercial catalysis of $SO_2$. This feature reduces the volume of gas handled in chamber 30, the amount of sulfur vapor burned therein for temperature raising purposes, and also the size of chamber 30.

In certain circumstances of commercial operation, introduction of appreciable amounts of water into the gas stream is not objectionable, and in such situation temperature increase in chamber 30 may be effected by introduction and combustion of suitable amounts of $H_2S$ gas, e. g., the same $H_2S$ gas as fed into chamber 12. Here again, the amounts of $H_2S$ gas fed into chamber 30 may vary widely but, as in the case of utilization of sulfur burner 31, quantities of $H_2S$ fed into chamber 30 should be such as to create and maintain therein the temperature conditions already stated. In a further modification, temperature increase in chamber 30 may be effected by adjustment of the valves in lines 52 and 82 so as to by-pass from the exit line of combustion chamber 12, through line 82, certain quantities of the exit gas of combustion chamber 12. As previously noted, such gases are ordinarily at the high temperatures of 2000° F. or more, and in accordance with this modification the sensible heat of an increment of primary combustion chamber exit gas is utilized in chamber 30 to raise the temperature of the composite gas thereinto the temperatures previously noted. In the operation of a procedure such as being exemplified in which the gas leaving the chamber 12 contains about 10% $SO_2$ and about 8% oxygen and is at temperature of about 2000° F., and the gas entering the secondary chamber 30 is at temperature of approximately 100–120° F., the quantity of gas by-passed from chamber 12 through line 82 into chamber 30 may be about one volume per two volumes of gas fed into chamber 30 through line 25.

Returning to the principal modification being described, i. e. use of sulfur burner 31, about 50% conversion of $SO_2$ to $SO_3$ may be effected in converter 36 and temperature of the exit gas thereof may be about 1100° F. Undried air is introduced into connecting line 37 in quantity sufficient to bring the temperature of the gas stream entering converter 38 to about 800° F., in which instance the gas entering converter 38 may contain about 8% $SO_2$ and 11% oxygen. In converter 38, around 90% overall conversion is effected and the gas exit thereof may be at temperature of around 950° F. Additional undried air is introduced through line 49 in quantity sufficient to reduce the temperature of the gas entering converter 41 to about 800° F., in which case the gas stream may contain around 6–7% $SO_2$ and about 13% oxygen. Interstage introduction of air eliminates use of heat exchangers. More importantly this feature provides for introduction into the converter system of a relatively large proportion of the total oxygen needed for commercial catalysis without the necessity of passing all of the air to satisfy oxygen requirements through chamber 30, thus facilitating further the size reduction of secondary combustion chamber 30 as referred to above. In converter 41, approximately 98% or better overall conversion to $SO_3$ is effected, and the gas stream exits converter 41 at temperature in the range of 800–850° F. As previously noted, such a gas may be utilized in conventional absorbing towers to produce strong sulfuric acid, or may be employed in so-called condensers which condense out, as strong sulfuric acid, the water vapor content of the gas stream with an equivalent amount of $SO_3$ and produce a condenser exit containing substantially dry $SO_3$ gas which may be used in an oleum producing system.

We claim:

1. The process for making sulfur trioxide which comprises burning sulfurous material to form an initial hot gas stream having temperature not less than 1600° F. and containing $SO_2$ and acid mist forming constituents and a substantial quantity of $H_2O$, cooling said gas stream to not higher than about 120° F. to condense out most of said $H_2O$ and form acid mist, contacting said gas stream containing said mist with sulfuric acid drying medium to further dry said gas stream and form an $SO_2$ gas at temperature substantially below initial conversion temperature and containing said sulfuric acid mist, burning in said $SO_2$ gas containing said mist, while in a refractory chamber, sulfurous material in quantity sufficient to raise the temperature of the resulting composite $SO_2$ gas to temperature at least approximating but not substantially in excess of initial conversion temperature to thereby vaporize said acid mist to change the same to non-deleterious form, and then catalytically converting $SO_2$ of said composite gas to $SO_3$, the entire foregoing operation being carried out at positive pressure and by utilization of undried atmospheric air as the oxidizing medium.

2. The process for making sulfur trioxide which comprises burning sulfurous material to form an initial hot gas stream having temperature not less than 1600° F. and containing $SO_2$ and acid mist forming constituents and a substantial quantity of $H_2O$, cooling said gas stream to not higher than about 120° F. to condense out most of said $H_2O$ and form acid mist, contacting said gas stream containing said mist with sulfuric acid drying medium to further dry said gas stream and form an $SO_2$ gas at temperature substantially below initial conversion temperature and containing said sulfuric acid mist, burning in said $SO_2$ gas containing said mist, while in a refractory chamber, elemental sulfur in quantity sufficient to raise the temperature of the resulting composite $SO_2$ gas to temperature at least approximating but not substantially in excess of initial conversion temperature to thereby vaporize said acid mist to change the same to non-deleterious form, and then catalytically converting $SO_2$ of said composite gas to $SO_3$, the entire foregoing operation being carried out at positive pressure and by utilization of undried atmospheric air as the oxidizing medium.

3. The process for making sulfur trioxide which comprises burning concentrated $H_2S$ gas to form an initial hot gas stream having temperature not less than 1600° F. and containing $SO_2$ and acid mist forming constituents and a substantial quantity of $H_2O$, cooling said gas stream to not higher than about 120° F. to condense out most of said $H_2O$ and form acid mist, contacting said gas stream containing said mist with sulfuric acid drying medium to further dry said gas stream and form an $SO_2$ gas at temperature substantially below initial conversion temperature and containing said sulfuric acid mist, burning in said $SO_2$ gas containing said mist, while in a refractory chamber, gaseous $H_2S$ in quantity sufficient to raise the temperature of the resulting composite $SO_2$ gas to temperature at least approximating but not substantially in excess of initial conversion temperature to thereby vaporize said acid mist to change the same to non-deleterious form, and then catalytically converting $SO_2$ of said composite gas to $SO_3$, the entire foregoing operation being carried out at positive pressure and by utilization of undried atmospheric air as the oxidizing medium.

HENRY F. MERRIAM.
URBAN S. LAUBER.

REFERENCES CITED

The following references are of record in the file of this patent:

UNITED STATES PATENTS

| Number | Name | Date |
|---|---|---|
| 1,737,320 | Merriam | Nov. 26, 1929 |
| 2,044,419 | Clark | June 16, 1936 |
| 2,079,760 | Carl | May 11, 1937 |

FOREIGN PATENTS

| Number | Country | Date |
|---|---|---|
| 367,381 | Great Britain | Feb. 19, 1932 |